(No Model.) 2 Sheets—Sheet 2.
R. M. HUNTER.
ELECTRIC RAILWAY.
No. 403,192. Patented May 14, 1889.
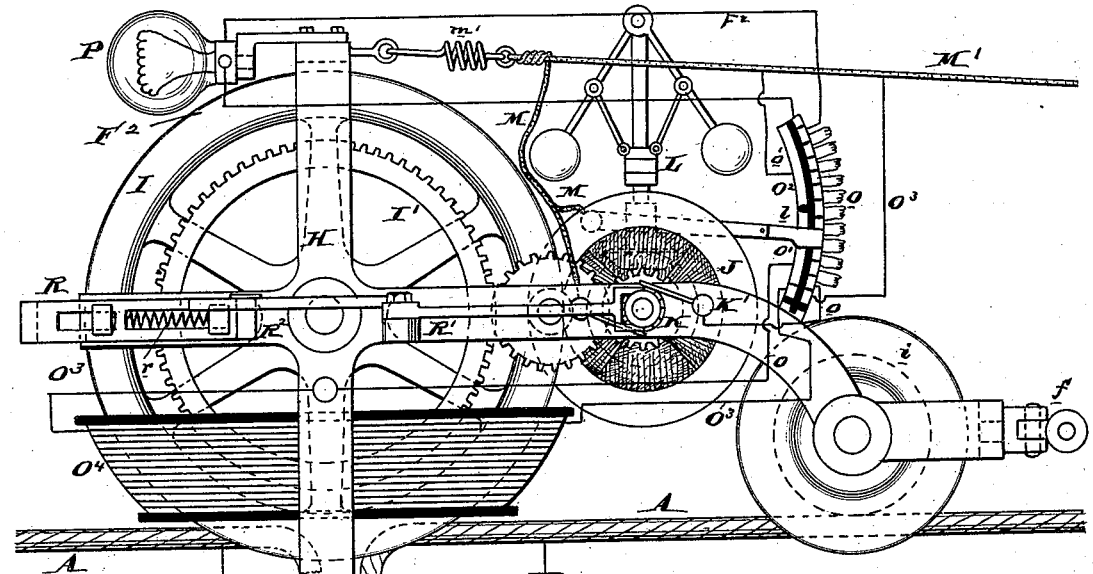
FIG. 4
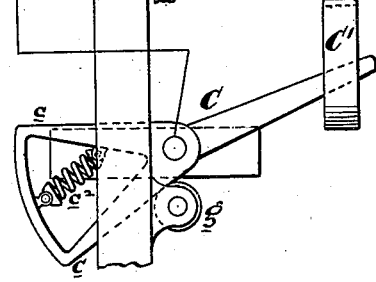
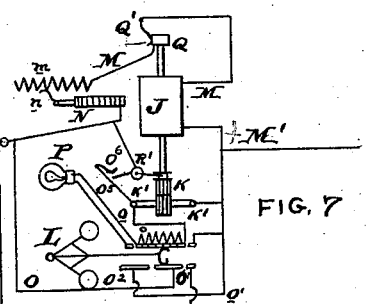
FIG. 7
FIG. 5
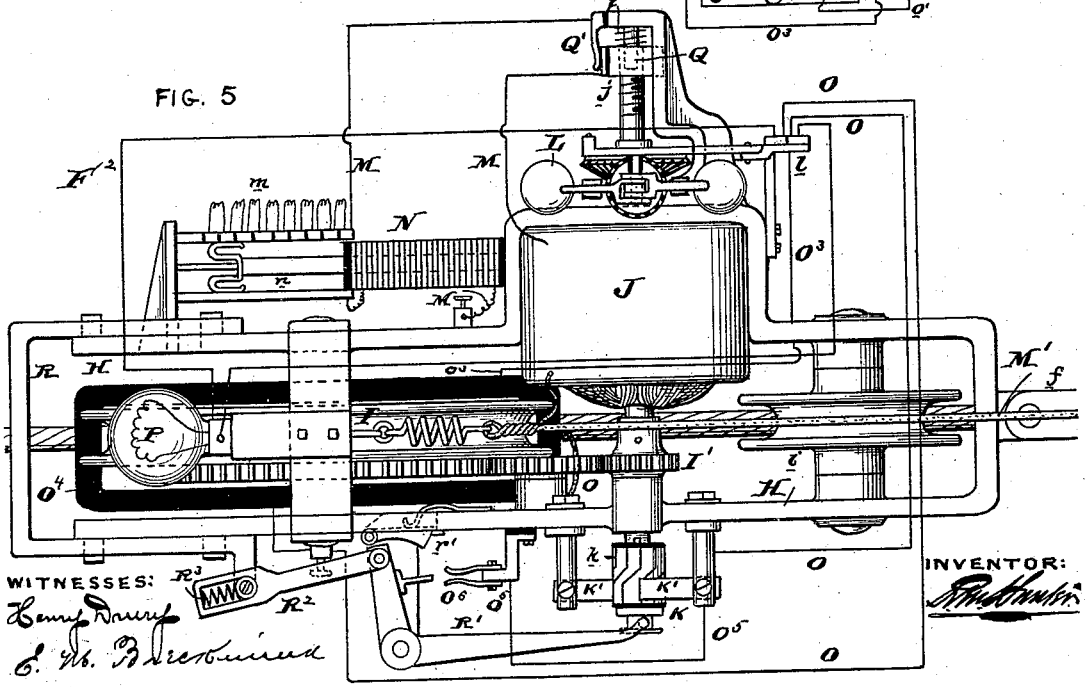
WITNESSES: 
INVENTOR:
N. PETERS. Photo-Lithographer, Washington, D. C.

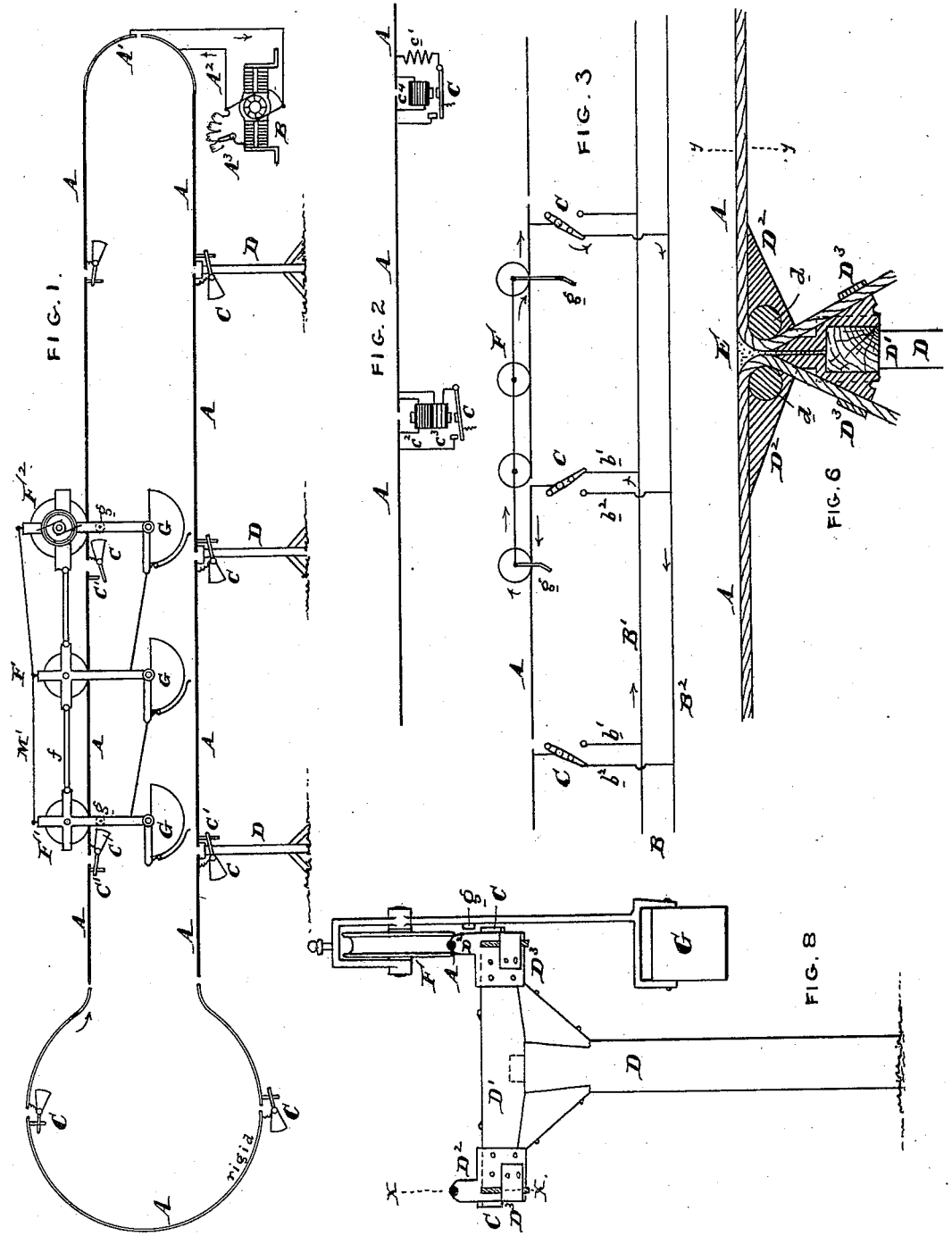

UNITED STATES PATENT OFFICE.

RUDOLPH M. HUNTER, OF PHILADELPHIA, PENNSYLVANIA.

ELECTRIC RAILWAY.

SPECIFICATION forming part of Letters Patent No. 403,192, dated May 14, 1889.

Original application filed May 22, 1886, Serial No. 202,950. Divided and this application filed December 13, 1888. Serial No. 293,484½. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways; and it consists in certain improvements, all of which are fully set forth in the following specification and shown in the accompanying drawings, which form part thereof.

This application (Case 74) is a division of my application, Serial No. 202,950, filed May 22, 1886.

There are two generic systems of electric railways, one in which the car or motor is controlled by an operator and is adapted for passenger transportation, and the other of which is for merchandise transportation and is self-regulating. This latter system, when cables or elevated rails are used, is technically called "telpherage," and it is to such system that my invention has more particular reference.

The essential feature of this system is that the motors or trains are made to travel over a conductor which is automatically broken at successive points within range of the length of the train, so that the current is brought up from the line through the motor and led back again to the line, whereby all the motors or trains are working in series with each other through a sectional conductor and receiving their electro energy from a common source. While I show and describe the railway as formed of taut wires, cables, or rails in an elevated position upon posts, it is to be understood that the same system is applicable to surface roads.

In carrying out my invention I stretch cables between posts or supports, say, one hundred feet apart, and these sections are electrically coupled by suitable switch devices, either mechanical or electrical, and adapted to be automatically actuated by the passing train or motors. A current of electricity is made to flow over said stretched line by a dynamo connected with the home end. The trains may be made up of several cars propelled by a single motor, or each car may have a motor, and said trains or motors should be of a length equal at least to the distance between two switches. The forward end of the train automatically opens one switch, while the rear end of the train closes the next switch in the rear. By this means there will only be one switch open at one time and this switch will make a break in the line. The current is led up from the rear end of the train through the electric motor to the forward end and again to line beyond the break. If the distance between the switches is small, then a single car may be made to operate the switches. This, however, would be more suitable in surface roads, and the particular means for accomplishing that result will form subject-matter of another application. The train in a telpherage system is without any one to control it; hence it must be made self-regulating. I therefore provide the motor of said train with the following devices:

First. If the speed should become too great, a governor of the ordinary centrifugal type is caused to gradually increase the resistance in the armature-circuit to retard the rotation.

Second. If the speed still increases, a further effect of the governor is to cut the armature-circuit out of line and complete a local circuit, and the motor now becomes a generator or dynamo, and the momentum of the train is made to do work in the generation of a current, increasing the line-current, and expending the armature-current in overcoming the resistance interposed.

Third. The resistance of the armature being taken out of the line-circuit, (be it arranged in multiple arc or series with the field-magnets of the motor,) there will be a variation in the resistance of the line. This, as well as the effect due to the increased generation of current due to running the motor as a generator, is regulated by an automatic resistance-changer, which reduces the resistance to the line-current through the field-magnets, increasing the power of the field of force, and thereby increasing the tendency of the armature to come to rest.

Fourth. If the incline is too steep and the load of the motor too great to be stopped, the governor will increase the resistance in the armature-circuit to a maximum and throw into said circuit a red light, preferably of the large incandescent type, indicating "danger" at night, and when the enormous speed of the train at a distance would not be perceived.

Fifth. In case of a collision the first concussion is received by a spring-buffer, the sliding action of which couples up the armature for a motor again, and simultaneously therewith shifts the commutator with respect to the armature, causing the motor to be reversed.

Sixth. Being reversed, the train is backed, and after a movement of twenty feet, or thereabout, the line-circuit is automatically broken by a mechanical device which can only come into play when the motor is reversed.

In addition to the above means for controlling the motor or train I provide a magnetizing coil or helix around the lower part of the main traction-wheel to magnetize it at starting to increase the traction upon the iron cable. This coil is cut into and out of circuit by the governor. The foregoing are the essential features of my improvements; but I also provide other details of construction, which will be explained hereinafter.

In the drawings, Figure 1 is a general view illustrating the main features of my system. Fig. 2 are diagrams illustrating methods of operating the switches electrically, but yet controlled by the passage of the train. Fig. 3 is a similar view showing the same general system, but in which the line-wires are separate from the working-conductors and connected to it at intervals, and in which the working-conductor is in sections. Fig. 4 is a side elevation of a train-motor embodying my invention. Fig. 5 is a plan view of same. Fig. 6 is a sectional elevation on line $x\,x$, showing method of uniting the ends of the line-conductors. Fig. 7 is a diagram illustrating the principles involved in the construction of the motor, and Fig. 8 is a cross-section of the railway on line $y\,y$.

A are sections of the working-conductor, which is shown as of stretched cables supported at their ends upon posts D D', but insulated from each other. (Best shown in Fig. 6.) They may be bent over guide-pulleys $d$, held in frames $D^2$, which are bolted to the cross-bars D' of the support, and the ends of the cables, after the cables are stretched, are clamped at $D^3$, the pulleys $d$ allowing the cables to be drawn up taut without excessive friction. The space E between the two frames $D^2$ of adjacent cables is filled with asphaltum, concrete, cement, or other hard and insulating material. One of the ends of these sections A is connected to the switches C, (see Fig. 1,) which, when closed, completes the line-circuit from one section to the next, the contact being made by springs C'. These switches C have the cam-faces $c\,c$, (see Fig. 4,) whereby they are adapted to be shifted by the passing train. The roller or pin $g$ on the forward motor or car opens the switch as the train runs upon each new section, and the roller or pin $g$ on the last car or motor (see Fig. 1) closes the switch as it leaves the section. The switch C is combined with a spring, $c'$, one end of which is secured to the base and the other end to the lever, so that as the lever is shifted the spring exerts itself, and when said lever is shifted to its extreme positions locks it in such positions, not relying upon friction to hold the switch open or closed. In addition to this function the spring assists in shifting the switch-lever, so as to make it operate quickly to open and close.

It is evident that the spring may be substituted by a weight device, they being equivalents. Referring to Fig. 1, it will be seen that by this means there is always a break in the line-circuit between the front car or motor, $F^2$, and rear car, F', of the train F.

G are buckets or cars for carrying earth, ores, coal, or other merchandise. They may, if desired, be passenger-cars. The sections A form a continuous track, the juncture of the terminals A', however, not being connected by a switch, but connected with the respective poles of the generator.

$A^3$ is a resistance-changer for short-circuiting a portion of the current from the generator, and may be used to regulate the line-current, and also to reduce the current in the line for the instant the train is passing over the break A' to prevent injury to its motor.

In place of making the switches C to be moved by contact with the train, they may be made automatic by the electric current flowing through the line. Two ways of accomplishing this are shown in Fig. 2.

$C^2$ is a high-resistance helix, and connects the adjacent ends of two sections, A, of the cable.

$C^3$ is a low-resistance coil, and has one terminal connected with one section A and the other terminal to the armature or switch C, which is attracted by the core of these helices. When the armature or switch is attracted, it connects with the other section A, and thus a closed circuit is made through the low-resistance coil. When a train spans or bridges one of these electrical switches, so much of the current is shunted that the armature falls, opening the low-resistance circuit and making a practical break in the line. After the train has passed, the total line-current is flowing through the high-resistance helix, which instantly draws up the armature C, bringing the low-resistance helix into circuit, and thereby protecting the fine wire of the high-resistance helix or shunt from destruction.

In place of two helices a single helix, $C^4$, may be used; but in this case a resistance, $c'$, must be put in the switch-circuit; otherwise magnet $C^4$, which is in a shunt-circuit between the sections A and the switch-armature, would act as a vibrator. I have shown electrically-actuated switches, but do not claim them specifically in this application. They form subject-matter of another application, Serial No. 215,458, filed October 6, 1886. In these cases it has been proposed to use the sections A as the line or supply circuit as well as the working-circuit. There is considerable objection to this, as the bare cables are exposed, and as the current is constantly passing over them there must of necessity be leakage and abnormal resistance due to imperfect contacts, which, when duplicated, are greatly magnified. In the system shown in Fig. 3 the current is fed to line-wires B' B², which are continuous and which may be embedded or properly supported and insulated above ground. From these wires the current is fed by branches $b'$ $b^2$ to the working-sections A, the switches C controlling the connection of the section A with the conductors B' or B². The working of this system is evident upon examining Fig. 3.

It will be noticed that only two sections A are coupled up in series while the train is in contact with them and all others are out of circuit and no current is passing over them.

$F^2$ is the motor-car. H is its frame, in which the main traction-wheel I and the trail or guide wheel $i$ are mounted.

J is the electric motor, and is carried by said frame H and is geared at I' with the main wheel I.

K is the commutator, and has an auxiliary part, $k$, in which the sections are advanced sufficiently for reversing the motor. This commutator is movable longitudinally upon the armature-shaft, so that the part $k$ may be moved into working position with the brushes K', if desired.

The various cars are connected by couplings $f$, which may have universal joints, as shown in Figs. 4 and 5, to admit of the long train turning corners and following quick changes in altitude. The current is brought from the rear car by wire M' to the motor. Here it divides, part of the current going through the field-magnet circuit M to frame H wheel I, to line, and part to the armature-circuit, frame H, wheel I, to line. Of course it is evident that the armature might be coupled up in series with the field-magnets in place of multiple-arc connection.

N is a helix in the circuit M, and operates an armature, $n$, which sweeps the resistances $m$, also in the circuit M, whereby the resistance in the field-magnet circuit may be automatically varied, for the purpose hereinafter specified.

L is an ordinary centrifugal or speed governor, and is connected either directly or indirectly with the armature-shaft of the motor; hence its speed is dependent upon the speed of the armature, and consequently the motor, as an entirety. This governor moves a contact-brush, $l$, which sweeps the resistance $o$ in the armature-circuit O, and also the contacts O' O², the former of which is in the armature-circuit and connects to line, and the latter of which is in a closed armature-circuit. When the speed is normal, the current passes from M through the armature, through circuit O, resistance $o$, contact O', and circuit O to line. Any slight variations in speed are governed by the governor increasing or decreasing the resistance $o$ in the armature-circuit. If, now, the speed should continue to increase, due, say, to a steep incline and heavy load, the governor will continue to move the contact-brush $l$, and it will leave contact O' and pass on to contact O², which is in circuit with the other end of the armature-circuit by wire $o'$. The armature is now cut out of the line-circuit and coupled up in a local circuit with the resistance $o$, which increases with the speed. The motor has now become a generator or dynamo-electric machine, and the resistance to the rotation of the armature is utilized as a brake. The motor has practically disappeared and the braking-dynamo is substituted in its stead. The current generated in the armature is expended in overcoming the resistance $o$, which is increased or decreased according as the speed of the train increases or decreases. The dynamo into which the motor has been converted through the inductive action of the armature augments the line-current, and this increase is further made apparent in that as the current in the line or field circuit M increases the helix N draws in its armature and reduces the resistance $m$. This reduction in the resistance increases the power of the field of force and acts more powerfully upon the armature, tending to bring it to rest much sooner. If the speed still increases, (which could only occur in exceptional cases or where there was derangement of some of the working parts of the motor,) the governor will close the armature-circuit through the danger-signal lamp P, which, while it acts as an additional resistance, is a signal at night to indicate the enormous speed at which the train is traveling and when its movement could not be perceived. This display of a danger-signal when the train was a long distance off would give ample time to operate a switch or turn-out, or provide suitable means to arrest the movement and prevent excessive damage. This signal-light would naturally be a red light, but might be of any color desired, and is preferably of the large incandescent type. There may be any number of these lights desired, and one or more white lights might be used as head-lights, as set forth in my application filed April 28, 1886, Serial No. 200,400. One other office of the governor is to close a branch circuit, $O^3$, including the helix $O^4$, surrounding the lower part of the traction or drive wheel I, to magnetize and cause it to attract the cable A and form a greater traction effect. This would come into play only at starting or when the train was running slowly, as in mounting heavy grades.

R is a buffer carried by the frame H, and is supported at the rear by springs $r$. If the car runs into anything, the first concussion is received by the buffer. The backward movement of the buffer is utilized to shift the commutator to bring the part $k$ under the brushes K' to reverse the motor, and also to couple up the armature into a motor-circuit again. This result is accomplished by a lever, R', which connects with the commutator, and a slotted link, $R^2$, which in turn connects the lever R' with the buffer R. As the buffer is forced back the lever R' is oscillated, shifting the commutator and closing the armature-circuit to line by wire $O^5$ and circuit-closer $O^6$. The instant the lever R' is shifted it is locked by spring-lock $r'$, and the buffer may remain locked against return, or it may be allowed to return, compressing the small spring $R^3$ in the link $R^2$. The motor is now reversed and the train travels backward away from the danger; but the instant the armature is reversed the screw $j$ thereon screws into the nut Q, pressed against it by light spring $q$, and causes said nut to travel and break the contact Q', which ruptures the line-circuit M through the field-magnets and stops the motor and train.

The switches C may be made to work upon a horizontal or vertical axis, as desired, or may be made like any of the well-known sliding switches. In the form shown (see Fig. 5) it would be advisable to use a locking-spring, $c'$, which acts to retain the switch in either of the extreme positions until positively acted upon by the rollers or switch-cams $g$. In place of cables A the rails may be made of bars, rods, or beams, elevated or upon the surface; or any or all of these may be combined to suit requirements in particular cases.

The line M', connecting the front and rear cars of a train, may be connected at one or both ends by springs $m'$, which allow for rocking or fore-and-aft swinging of the cars or motors, or for changes due to the train traveling over unequal elevations. At curves the cables A would be changed to rigid curved sections.

The motor proper may be of the series, shunt, or compound-shunt type, or any other form.

In this application I do not claim the series railway, broadly, nor the suspended conductors upon which the cars run, as these, with any other details not claimed, form subject-matter of my application above referred to, and also my application, Serial No. 215,458, filed October 6, 1886.

It is very evident that the details of construction may be changed and modified in various ways without departing from the invention. Therefore I do not in any wise limit myself to the particular constructions shown.

Having now described my invention, what I claim as new, and desire to secure by Letters Patent, is—

1. The combination of a sectional working-conductor, the end sections thereof being curved and all the sections being arranged end to end, but insulated from each other to form a mechanically-continuous but electrically-interrupted conductor like a severed loop, switches at all the breaks but one to normally bridge from one section to the next and close the breaks, an electric generator, and connecting-conductors connecting the working-conductor sections on each side of the unclosed break in the looped portion with the two poles of the generator, substantially as and for the purpose specified.

2. The combination of the end sections of two lines of working-conductors arranged end to end to form a mechanically-continuous conductor, but having the adjacent ends of said sections electrically insulated from each other, a traveling electric motor receiving electricity therefrom, an electric generator, and connecting-conductors connecting the respective working-conductors with the opposite poles of the generator, whereby the electric motor coming in on one line may run out on the other line without interruption, substantially as and for the purpose specified.

3. In the herein-described system of telpherage, the combination of a conductor divided into sections, switches which normally bridge from one section to the other and are adapted to be actuated by a passing train or vehicle, traveling trains or vehicles, one or more electric motors on the trains or vehicles by which they are driven, and devices operated by the trains or vehicles to move said switches successively and divert the current through the motors on said trains or vehicles, so that the motors are connected in series through the sectional conductor, and a locking device to lock said switch in either of its extreme positions, substantially as and for the purpose specified.

4. In the herein-described system of telpherage, the combination of a conductor divided into sections, switches which normally bridge from one section to the other, traveling trains or vehicles, one or more electric motors on the trains or vehicles by which they are driven, and devices operated by the trains or vehicles to move said switches successively and divert the current through the motors on said trains or vehicles, so that the motors are connected in series through the sectional conductor, and a spring device to assist in the movement of the switch and then retain it in the position assumed, substantially as and for the purpose specified.

5. The combination of a support or roadway, electrically-actuated trains or vehicles traveling along said support or roadway, an electric circuit, a source of electric energy, and one or more motors on the trains or vehicles for driving them connected in series in said circuit, a governor carried by the motor, and a variable resistance in the armature-circuit controlled by the governor, substantially as and for the purpose specified.

6. The combination of a support or roadway, electrically-actuated trains or vehicles traveling along said support or roadway, an electric circuit, a source of electric energy, and one or more motors on the trains or vehicles for driving them connected in series in said circuit, a governor carried by the motor, and a variable resistance in the armature-circuit controlled by the governor, and a short-circuiting device, also controlled by the governor, to short-circuit the armature, substantially as and for the purpose specified.

7. The combination of a support or roadway, electrically-actuated trains or vehicles traveling along said support or roadway, an electric circuit, a source of electric energy, and one or more motors on the trains or vehicles for driving them connected in series in said circuit, a governor carried by the motor, and a variable resistance in the armature-circuit controlled by the governor, and means, also controlled by the governor, to short-circuit the armature and vary the resistance of the armature-circuit, substantially as and for the purpose specified.

8. The combination of a support or roadway, electrically-actuated trains or vehicles traveling along said support or roadway, electric circuit, a source of electric energy, and one or more motors on the trains or vehicles for driving them connected in series in said circuit, a governor carried by the motor, a variable resistance in the armature-circuit controlled by the governor, means, also controlled by the governor, to short-circuit the armature and vary the resistance of the armature-circuit, and a danger-signal located in said armature-circuit, substantially as and for the purpose specified.

9. The combination of a support or roadway, electrically-actuated trains or vehicles traveling along said support or roadway, an electric circuit, a source of electric energy, and one or more motors on the trains or vehicles for driving them connected in series in said circuit, a governor carried by the motor, a variable resistance in the armature-circuit controlled by the governor, means, also controlled by the governor, to short-circuit the armature and vary the resistance of the armature-circuit, a danger-signal located in said armature-circuit, and a switch controlled by the speed of the motor to actuate the danger-signal, substantially as and for the purpose specified.

10. The combination of a support or roadway, electrically-actuated trains or vehicles traveling along said support or roadway, an electric circuit, a source of electric energy, and one or more motors on the trains or vehicles for driving them connected in series in said circuit, a governor carried by the motor, a variable resistance in the armature-circuit controlled by the governor, means, also controlled by the governor, to short-circuit the armature and vary the resistance of the armature-circuit, a danger-signal consisting of an electric lamp, and a switch controlled by the speed of the motor to put it into circuit, substantially as and for the purpose specified.

11. The combination of a support or roadway, electrically-actuated trains or vehicles traveling along said support or roadway, an electric circuit, a source of electric energy, and one or more motors on the trains or vehicles for driving them connected in series in said circuit, a governor carried by the motor, a variable resistance in the armature-circuit controlled by the governor, means, also controlled by the governor, to short-circuit the armature and vary the resistance of the armature-circuit, a danger-signal consisting of an electric lamp arranged to be connected with armature-circuit, and a switch controlled by the speed of the motor to put it into circuit with the armature, substantially as and for the purpose specified.

12. In an electric railway, the combination of a traveling vehicle, an electric motor carried thereon for actuating it, a danger-signal, and means controlled by the speed of the vehicle to display the danger-signal, substantially as and for the purpose specified.

13. In an electric railway, the combination of a traveling vehicle, an electric motor carried thereon for actuating it, an electric danger-signal, a switch, and means controlled by the speed of the vehicle to close the switch and display the danger-signal, substantially as and for the purpose specified.

14. In an electric railway, the combination of a traveling vehicle, an electric motor carried thereon to actuate it, a governor, a variable resistance, and circuit switches and connections, substantially as set forth, controlled by said governor during a gradually-increased speed of the vehicle to perform the following duties, viz: cut the armature out of line-circuit, put it into a closed or short circuit, and increase the resistance of the closed armature-circuit, substantially as and for the purpose specified.

15. In an electric railway, the combination of a traveling vehicle, an electric motor carried thereon to actuate it, a governor, a variable resistance, and circuit switches and connections, substantially as set forth, controlled by said governor during a gradual increased speed of the vehicle to perform the following duties, viz: increase the resistance of the line armature-circuit, cut the armature out of line-circuit, put it into a closed or short circuit, and increase the resistance of the closed armature-circuit, substantially as and for the purpose specified.

16. In an electric railway, the combination of a traveling vehicle, an electric motor carried thereon to actuate it, a governor, a variable resistance, a danger-signal, and circuit switches and connections, substantially as set forth, controlled by said governor during a gradual increased speed of the vehicle to perform the following duties, viz: increase the resistance of the line armature-circuit, cut the armature out of line-circuit, put it into a closed or short circuit, increase the resistance of the closed armature-circuit, and interpose in the armature-circuit an electric danger-signal, substantially as and for the purpose specified.

17. In an electric railway, the combination of a traveling vehicle, an electric motor carried thereon to actuate it, a governor, a variable resistance, and circuit switches and connections, substantially as set forth, controlled by said governor during a gradual increased speed of the vehicle to perform the following duties, viz: increase the armature-circuit resistance and then cut the armature out of line-circuit, substantially as and for the purpose specified.

18. In an electric railway, the combination of a traveling vehicle, an electric motor carried thereon to actuate it, a governor, a variable resistance, an electric danger-signal, and circuit switches and connections, substantially as set forth, controlled by said governor during a gradual increased speed of the vehicle to perform the following duties, viz: increase the armature-circuit resistance, then cut the armature out of line-circuit, and interpose an electric danger-signal in the armature-circuit, substantially as and for the purpose specified.

19. In an electric railway, the combination of a traveling vehicle, an electric motor carried thereon to actuate it, a traction-increasing helix, a governor, a variable resistance, and circuit switches and connections, substantially as set forth, controlled by said governor during a gradual increased speed of the vehicle to perform the following duties, viz: reduce the traction-power of the vehicle by cutting out the traction-helix and then increase the resistance of the armature-circuit, substantially as and for the purpose specified.

20. In an electric railway, the combination of a traveling vehicle, an electric motor carried thereon to actuate it, a traction-increasing helix, a governor, a variable resistance, and circuit switches and connections, substantially as set forth, controlled by said governor during a gradual increased speed of the vehicle to perform the following duties, viz: reduce the traction-power of the vehicle by cutting out the traction-helix, then increase the resistance of the armature-circuit, and finally short-circuit the armature, substantially as and for the purpose specified.

21. In an electric railway, the combination of a traveling vehicle, an electric motor carried thereon for actuating it, a magnetizing-coil around the traction-wheel, and a switch controlled by the speed of the vehicle to put said coil in and out of circuit, whereby it shall always be in circuit at slow speeds or when starting, but out of circuit at high speeds, substantially as and for the purpose specified.

22. In an electric railway, the combination of a traveling vehicle, an electric motor carried thereon for actuating it, a magnetizing-coil around the traction-wheel, a switch, and a governor controlled by the speed of the vehicle to operate the switch and put said coil in and out of circuit, whereby it shall always be in circuit at slow speeds or when starting, but out of circuit at high speeds, substantially as and for the purpose specified.

23. In an electric railway, the combination of a traveling vehicle, an electric motor carried thereon for actuating it, the field-magnets and armature being arranged in multiple-arc connection, a variable resistance in the field-magnet circuit, and an automatic resistance-changer adapted to vary the resistance in accordance with changes in the current strength, substantially as and for the purpose specified.

24. In an electric railway, a traveling vehicle, an electric motor carried thereon for actuating it, the field-magnets and armature being arranged in multiple-arc connection, a variable resistance in the field-magnet circuit, and an automatic resistance-changer adapted to vary the resistance inversely in accordance with changes in the current strength, in combination with a variable resistance located in the armature-circuit, substantially as and for the purpose specified.

25. In an electric railway, a traveling vehicle, an electric motor carried thereon for actuating it, the field-magnets and armature being arranged in multiple-arc connection, a variable resistance in the field-magnet circuit, and an automatic resistance-changer adapted to vary the resistance inversely in accordance with changes in the current strength, in combination with a variable resistance located in the armature-circuit and a switch to short-circuit the armature, substantially as and for the purpose specified.

26. In an electric railway, a traveling vehicle, an electric motor carried thereon for actuating it, the field-magnets and armature being arranged in multiple-arc connection, a variable resistance in the field-magnet circuit, and an automatic resistance-changer adapted to vary the resistance inversely in accordance with changes in the current strength, in combination with a variable resistance located in the armature-circuit, and a switch to short-circuit the armature and increase the resistance in the short circuit of the armature, substantially as and for the purpose specified.

27. In an electric railway, the combination of a traveling vehicle, an electric motor carried thereon for actuating it, the field-magnets and armature being arranged in multiple-arc connection, an automatic resistance-changer interposed in the field-magnet circuit, and a resistance-changer located in the armature-circuit, substantially as and for the purpose specified.

28. In an electric railway, the combination of a traveling vehicle, an electric motor carried thereon for actuating it, the field-magnets and armature being arranged in multiple-arc connection, a resistance-changer interposed in the field-magnet circuit, and a resistance-changer located in the armature-circuit, and a switch to short-circuit the armature, substantially as and for the purpose specified.

29. In an electric railway, the combination of a traveling vehicle, an electric motor carried thereon for actuating it, the field-magnets and armature being arranged in multiple-arc connection, a resistance-changer interposed in the field-magnet circuit, and a resistance-changer located in the armature-circuit, a switch to short-circuit the armature, and a governor to actuate said switch, substantially as and for the purpose specified.

30. In an electric railway, the combination of a traveling vehicle, an electric motor carried thereon for actuating it, the field-magnets and armature being arranged in multiple-arc connection, a resistance-changer interposed in the field-magnet circuit, and a resistance-changer located in the armature-circuit, and a governor to actuate said armature-resistance changer, substantially as and for the purpose specified.

31. In an electric railway, the combination of a traveling vehicle, an electric motor carried thereon for actuating it, the field-magnets and armature being arranged in multiple-arc connection, a resistance-changer interposed in the field-magnet circuit, and a resistance-changer located in the armature-circuit, a switch to short-circuit the armature, and a governor to actuate said armature-resistance changer and switch, substantially as and for the purpose specified.

32. In an electric railway, the combination of the traveling vehicle, an electric motor carried thereon for actuating it, a buffer and lever mechanism actuated by said buffer to change the relative position of the commutator-sections with the brushes to reverse the motor, and a lock to retain said parts in their new relative position, substantially as and for the purpose specified.

33. In an electric railway, the combination of the traveling vehicle, an electric motor carried thereon for actuating it, a buffer and lever mechanism actuated by said buffer to change the relative position of the commutator-sections with the brushes to reverse the motor, and a circuit-breaker controlled by the backward travel of the vehicle to cut the motor out of circuit to arrest its movement, substantially as and for the purpose specified.

34. In an electric railway, the combination of the traveling vehicle, an electric motor carried thereon for actuating it, a buffer and lever mechanism actuated by said buffer to change the relative position of the commutator-sections with the brushes to reverse the motor, a lock to retain said parts in their new relative position, and a circuit-breaker controlled by the backward travel of the vehicle to cut the motor out of circuit to arrest its movement, substantially as and for the purpose specified.

35. The combination of a traveling vehicle, an electric motor carried thereon for actuating it, and a circuit-breaker controlled by the backward movement of the vehicle or motor to cut the motor out of circuit, substantially as and for the purpose specified.

36. The combination of a traveling vehicle, an electric motor carried thereon for actuating it, a circuit-breaker consisting of the thread $j$, the loose nut Q, and contacts Q′, controlled by the backward movement of the vehicle or motor to cut the motor out of circuit, substantially as and for the purpose specified.

37. The combination of a traveling vehicle, an electric motor carried thereon for actuating it, and a circuit-breaker consisting of the thread $j$, the loose nut Q, contacts Q′, and spring $q$, controlled by the movement of the vehicle or motor to cut the motor out of circuit, substantially as and for the purpose specified.

38. The combination of a traveling vehicle, an electric motor carried thereon for actuating it, a governor controlled by the speed of the vehicle and adapted to cut the motor-armature out of line-circuit and put it in a short or closed circuit, a reversing device, and a switch controlled by the reversing device to couple the armature into line-circuit, substantially as and for the purpose specified.

39. The combination of a traveling vehicle, an electric motor carried thereon for actuating it, a governor controlled by the speed of the vehicle and adapted to cut the motor-armature out of line-circuit and put it in short or closed circuit, a reversing device, and a switch controlled by the reversing device to couple the armature into line-circuit again, and a circuit-breaker to break the line-circuit after the motor has run back a short distance, substantially as and for the purpose specified.

40. The combination of a traveling vehicle, an electric motor carried thereby for actuating it, a spring-buffer attached thereon, and motor-reversing devices actuated thereby to reverse the motor automatically upon a collision, substantially as and for the purpose specified.

41. The combination of a traveling vehicle, an electric motor carried thereby for actuating it, a spring-buffer attached thereon, and motor-reversing devices actuated thereby to reverse the motor automatically upon a collision, an armature-circuit closer also actuated by said buffer, and a lock to keep said circuit closed, substantially as and for the purpose specified.

42. The combination of a traveling vehicle, a motor carried thereon for actuating it, the brushes K′ and commutator K, having part $k$, constructed, as set forth, for reversing, said commutator being movable longitudinally upon the armature-shaft, a spring-buffer, and intermediate connections to move said commutator, substantially as and for the purpose specified.

43. The combination of a traveling vehicle, an electric motor carried thereon for actuating it, armature-resistances normally in circuit, means to reverse the motor, and a switch to automatically cut out the armature-resistances upon reversing the motor, substantially as and for the purpose specified.

44. The combination of a sectional working-conductor, a train of vehicles of a length equal to or greater than one of the sections of the conductor, electric motors on said train for propelling it, switches for bridging the sections of the working-conductors and actuated by the passing train, and a motor-circuit extending from the front to the rear of the train and connecting with the working-conductors, and springs to keep said motor-conductor taut and yet allow for movement of the cars or vehicles of the train, substantially as and for the purpose specified.

45. The combination of the conductor-sections A A, supports D², and clamps D³, substantially as and for the purpose specified.

46. The combination of the conductor-sections A A, supports D², insulation E, and clamps D³, substantially as and for the purpose specified.

47. The combination of the conductor-sections A A, supports D², rollers d, and clamps D³, substantially as and for the purpose specified.

48. In the herein-described system of telpherage, the combination of a conductor divided into sections, switches which normally bridge from one section to the other, traveling trains or vehicles, one or more electric motors on the trains or vehicles by which they are driven, and devices operated by the trains or vehicles to move said switches successively and divert the current through the motors on said trains or vehicles, so that the motors are connected in series through the sectional conductor, and a spring device to assist the movement of the switch, substantially as and for the purpose specified.

49. The combination, with conductor-sections insulated from each other, a traveling motor receiving electricity from said conductor, a pivoted switch, C, to connect said sections together, a spring, c, connecting said switch with its support and placed so as to be under compression in the two extreme positions of said switch to assist both in opening and closing the switch, and a trip carried by the traveling motor to shift the switch as it passes from one section to the next.

50. The combination of a stationary working-conductor arranged along the railway, a traveling vehicle, a motor carried thereon to propel the same and receiving electricity from said conductor, a magnetizing-coil surrounding the lower part of one of the wheels of said vehicle, and a circuit in connection with line-working conductor to pass a current through said coil, substantially as and for the purpose specified.

51. The combination of a stationary working-conductor arranged along the railway, a traveling vehicle, a motor carried thereon to propel the same and receiving electricity from said conductor, a magnetizing-coil surrounding the lower part of one of the wheels of said vehicle, a circuit in connection with the motor-circuit to pass a current through said coil, and a switch to open or close said circuit, substantially as and for the purpose specified.

52. The combination of a stationary working-conductor arranged along the railway, a traveling vehicle, a motor carried thereon to propel the same and receiving electricity from said conductor, a magnetizing-coil surrounding the lower part of one of the wheels of said vehicle, a circuit to pass a current through said coil, and a variable resistance in the magnetizing-circuit, substantially as and for the purpose specified.

53. The combination of two terminals of conductors brought close together, a pivoted switch adapted to close or interrupt the circuit between said conductors, and a spring to resist the movement of the switch on starting to shift it, the said spring being positively connected with the switch.

54. The combination of two terminals of conductors brought close together, a pivoted switch adapted to close or interrupt the circuit between said conductors, and a spring to resist the movement of the switch on starting to shift it, the said spring being positively connected with the switch, and assist it upon the last portion of its movement in being shifted.

In testimony of which invention I hereunto set my hand.

RUDOLPH M. HUNTER.

Witnesses:
ERNEST HOWARD HUNTER,
E. M. BRECKINREED.